May 3, 1955
J. O. LEWIS
2,707,394
APPARATUS FOR INDICATING WEIGHT
AND RATE OF LIQUID DELIVERED
Filed Nov. 5, 1949
2 Sheets-Sheet 1
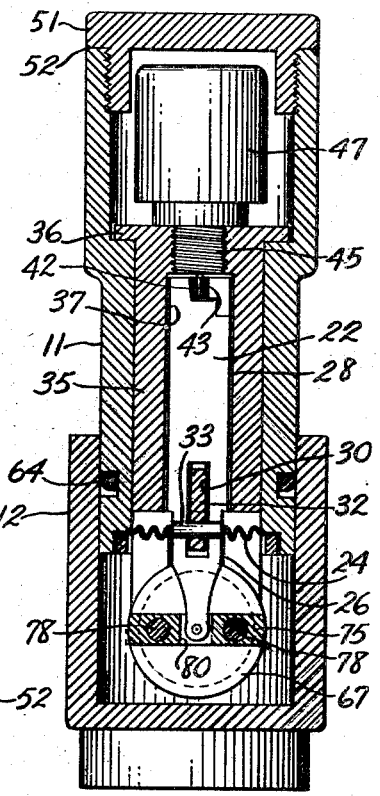
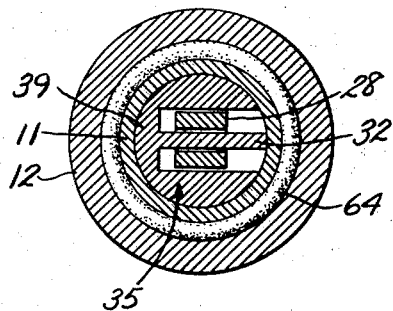
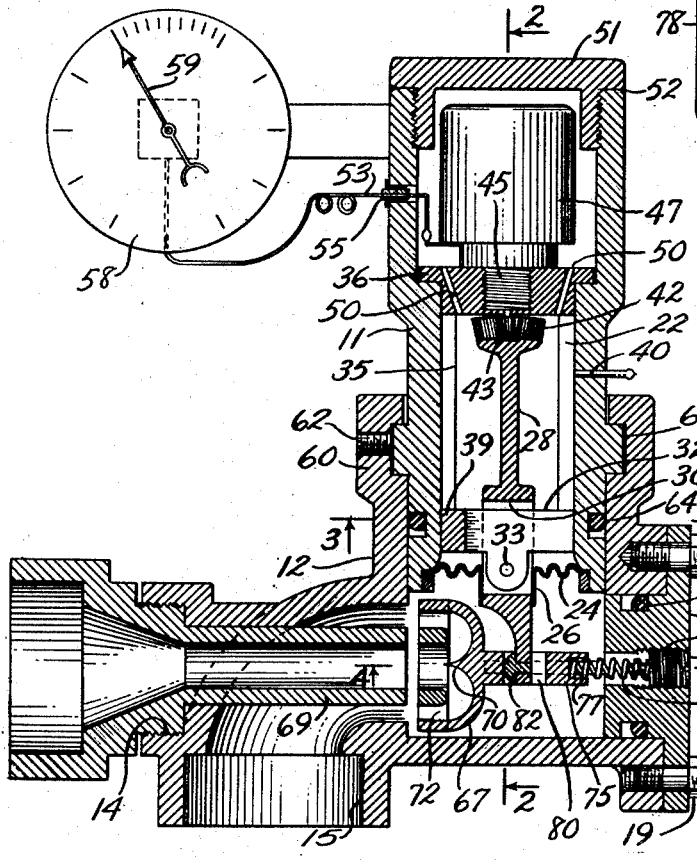
INVENTOR
John O. Lewis
BY Emery Varney
Whittemore & Diry.
ATTORNEY

United States Patent Office 2,707,394
Patented May 3, 1955

2,707,394

APPARATUS FOR INDICATING WEIGHT AND RATE OF LIQUID DELIVERED

John O. Lewis, Woodside, N. Y., assignor, by direct and mesne assignments, to Flowflax Corporation, New York, N. Y., a corporation of New York Application November 5, 1949, Serial No. 125,825

5 Claims. (Cl. 73—228)

This invention relates to apparatus for measuring the flow of liquid in terms of the weight of liquid delivered per time unit.

Meters that measure the volume of liquid flow have a serious disadvantage when the liquid is to be used for industrial processes or other purposes requiring specified weights of the liquid. A measured volume can always be translated into weight by computation when the temperature, pressure, and density are known, but such computations require labor and result in delay.

It is an object of this invention to provide an improved apparatus that indicates the rate of liquid flow directly in units of weight, such as pounds. The apparatus is operated by the momentum of the liquid flowing past or through it, and in the preferred construction there is provision made for compensating for the fact that momentum varies as the second power of the velocity and therefore supplies a force that does not vary uniformly with changes in the weight of liquid flowing, the value that is to be measured.

Features of the invention relate to the construction of the meter with the working parts sealed from the liquid stream and vane element by a flexible diaphragm of special construction that permits location of a fulcrum pivot in the neutral plane of the diaphragm. The chamber containing the working parts is filled with liquid that protects the parts and that permits a thinner and more sensitive sealing diaphragm to be used by reducing the pressure differential across the diaphragm.

Another object of the invention is to provide a flow meter in which the velocity of the stream to be measured is increased and then reversed in order to obtain a substantial operating force for the meter even though the flow is small. In this way the accuracy of the measurements at low rates of flow is increased.

Other objects, features and advantages of the invention will appear or be pointed out as the description proceeds.

Figure 4:
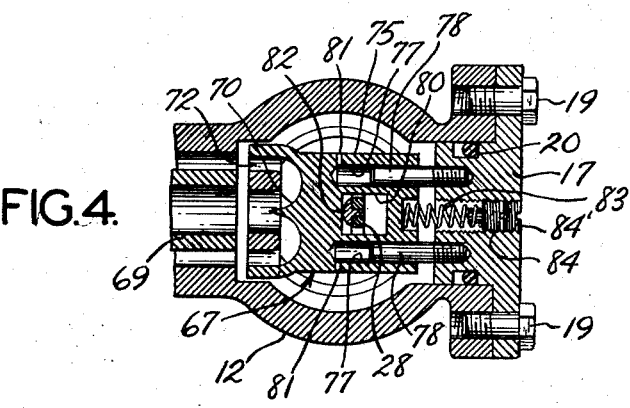
Figure 6:
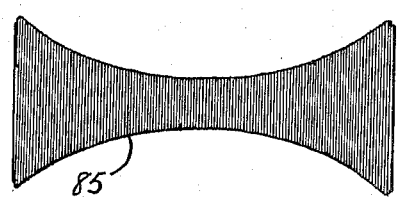
Figure 5:
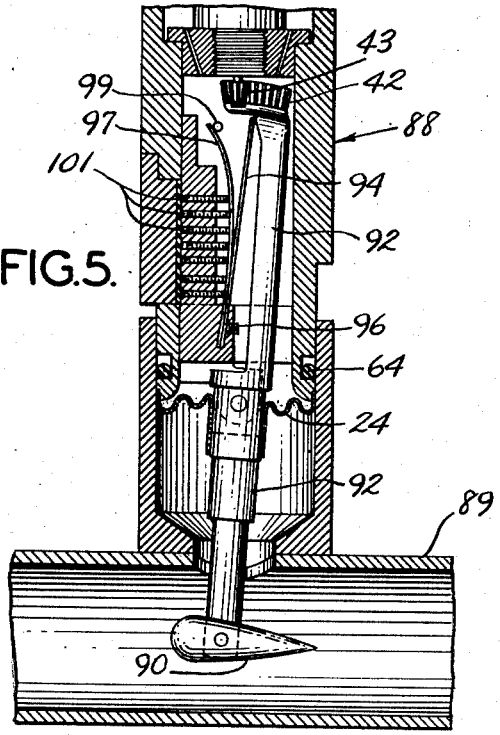

In the drawing, forming a part hereof, in which like reference characters indicate corresponding parts in all the views, Figure 1 is a sectional view through a flow meter made in accordance with this invention, Figures 2, 3 and 4 are sectional views taken on the lines 2—2, 3—3 and 4—4, respectively, of Figure 1, Figure 5 is a sectional view showing a modified form of the invention, Figure 6 is a diagrammatic illustration of the potentiometer used in the apparatus shown in Figure 1.

Figure 1 shows a housing 11 connected at its lower end with a casting 12. There is a liquid inlet passage 14 at one end of the casting and a liquid outlet discharge passage 15 at the bottom of the casting. The other end of the casting is closed by a plug 17 which is attached to the casting by a ring of screws 19. This plug 17 is sealed against leakage by an O-ring 20.

The housing 11 encloses a chamber 22 which is sealed at its lower end by a resilient and flexible metal diaphragm 24, the edges of which are soldered or otherwise bonded to a shoulder at the lower end of the chamber.

The diaphragm 24 has circular corrugations surrounding a center sleeve 26 that is integrally secured to the edges of a central opening through the diaphragm. An operating lever 28 extends through the sleeve 26 and is of such a cross section, at the lower end of the sleeve, that is fully fills the sleeve and is bonded to the sleeve so as to form a portion of the seal between the chamber 22 and the space within the casting 12 below the diaphragm.

The operating lever 28 has a slot 30 extending through it. The lower end of this slot is within the sleeve 26 and at a substantial distance below the neutral plane of the diaphragm. The expression "neutral plane of the diaphragm" being used herein to designate the plane or other imaginary surface that passes through the points of inflection of the diaphragm corrugations when the diaphragm is in the position that it occupies when not deflected by forces from either side. A tongue 32 extends through the slot 30 and supports a pivot pin 33 which serves as a fulcrum pivot bearing for the operating lever 28. The tongue 32 has sufficient clearance at both the upper and ends of the slot 30 so as not to interfere with the rocking of the operating lever 28 on its fulcrum pivot 33.

The axis of the fulcrum pivot 33 is preferably located in substantially the neutral plane of the diaphragm 24 so that rocking of the lever 28 on its fulcrum deflects the diaphragm symmetrically in opposite directions on both sides of the pivot axis and thus does not change the volume of the sealed chamber 22 above the diaphragm.

A retaining plug 35 fits into the chamber 33 and has a flange 36 at its upper end resting on a shoulder in the housing 11 and supporting the retaining plug at a predetermined level. This retaining plug has a slot 37 extending throughout most of its length, and the tongue 32 is connected with the lower portion of the retainer plug 35 by a section 39 of the plug, best shown in Fig. 3.

Although the chamber 32 (Figs. 1 and 2) is preferably cylindrical, the slot 37 in the retaining plug 35 is of rectangular cross section and is only slightly wider than the transverse width of the operating lever 28. As the operating lever 28 swings back and forth in the chamber 22, therefore, the fluid in the chamber at one side of the operating lever 28, has to move through comparatively small clearances in order to pass to the other side of the operating lever, and this action damps the oscillations of the operating lever 28.

In the preferred construction, the chamber 22 is filled with liquid which is initially injected into the chamber through a passage 40. This passage 40 is sealed after the liquid has been injected into the chamber. Before the liquid is injected into the chamber, the air is exhausted from the chamber through the passage 40.

One of the advantages of filling the chamber 22 with liquid is that the movement of the operating lever is more effectively damped than with air or other gas in the chamber. Another advantage is that the liquid above the diaphragm 24, being incompressible, saves the diaphragm from excessive loading when a substantial pressure of water or other liquid is exerted against the bottom of the diaphragm during the operation of the apparatus. The liquid used in the chamber 22 must be non-corrosive and should not be adversely affected by temperature changes within the range for which the apparatus is intended to be used. Suitable liquids are transformer oil and liquid silicones.

The operating lever 28 connects with motion transmitting means comprising a gear segment 42 connected to the top of the operating lever 28 and a pinion gear 43 that meshes with the gear segment 42. This pinion gear is secured to a shaft which extends upward through a bushing 45 threaded into an opening at the top of the retaining plug 35. The pinion shaft extends into a potentiometer 47 located in the upper end of the housing 11.

The interior of the housing 11, above the retaining plug 35 communicates with the chamber 22 through conduits 50 that open through the top of the retaining plug. A cap 51 screws into the top of the housing 11 to seal the upper end of the housing and is preferably held by solder 52. There are wires 53 extending from the potentiometer 47 through a seal 55 in the wall of the housing for connecting an indicator 58 outside of the housing with the potentiometer 47. This indicator 58 is shown attached to the upper part of the housing 11, but it will be understood that the indicator may be at some remote location if desired. The indicator has a hand 59 movable across a scale graduated to read directly in terms of pounds of liquid per minute, or other weight designations for each unit of time.

The housing 11 is connected with the casting 12 by projections 60 extending from the housing into undercut recesses in the casting 12. These projections 60 are put into the undercut recesses by pushing the housing downward while it is in a position in which the projections 60 can move downward freely into parts of the casting where the diameter is equal to the full diameter of the housing 11 across the projections 60. The housing 11 is then rotated to bring the projections 60 into the undercut recesses in somewhat the same manner as the securing of a bayonet type lock.

A set screw 62 prevents the housing 11 from turning on the casting 12, and thereby prevents the housing from moving into a position that would allow it to be lifted from the casting. An O-ring 64 seals the apparatus from leakage between the outside of the housing 11 and the confronting inside faces of the casting 12.

In the space below the diaphragm 24, there is a vane element 67 located in the path of the liquid stream of which the flow is to be measured. In the construction shown in Figs. 1, 2 and 4, the vane element 67 is a bucket having a front surface shaped to reverse the direction of a liquid stream that is projected against it.

A nozzle 69 extends through the inlet passage 14 and has converging side walls that reduce the cross-section of the liquid stream and cause an increase in the velocity of the liquid as it approaches the discharge end of the nozzle. The higher velocity supplies a considerably greater force for operating the apparatus because the force of the liquid is proportional to the square of the velocity. The discharge end of the nozzle is in front of a generally conical center region 70 of the vane element 67. The vane element extends beyond the nozzle on all sides and has a substantially annular discharge outlet 72 from which the reversed stream of liquid discharges into the annular space around the nozzle 69. This annular space leads to the liquid outlet 15.

The advantage of the shape of the vane element 67, with its symmetry around the axis of the nozzle 69, is a balancing of the force of the liquid in all radial directions with respect to the vane element 67. Vane elements of other shapes can be used, but one of the features of the invention disclosed in Figs. 1, 2 and 4 is that the direction of the liquid stream is reversed, and the force available for measuring is thereby increased.

The vane element 67 has a rearward extension 75 with bores 77 into which studs 78 extend. These studs 78 are rigidly connected with the plug 17. The vane element is free to slide axially on the studs 78, but the studs prevent rotary movement of the vane element and thereby keep a slot 80 of the vane element always in an upright position. Vent openings 81 drilled into the bores 77 near their inner ends provide for the movement of fluid into and out of the bores beyond the studs 78. The bores 77 and studs 78 are merely representative of bearing means along which the vane element 67 is movable in a substantially straight line.

The lower end of the operating lever 78 extends into the slot 80 and has a button 82 on its front face in contact with the forward end of the slot 80. When the apparatus is in operation, the force of the liquid stream against the front face of the vane element 67 maintains the vane element in contact with the button 82, and any displacement of the vane elements by an increase in the force of the liquid stream moves the lower end of the operating lever and rocks the lever on its pivot pin 33. This rocking movement causes the gear segment 42 to rotate the pinion gear 43 and transmit the motion of the vane element to the potentiometer 47.

In order to obtain uniform results from different units in spite of manufacturing tolerances, and particularly differences in the resilience and flexibility of the diaphragm 24, the vane element 67 is equipped with a spring 83 compressed between a socket of the rearward extension 75 and an adjusting screw 84 threaded into the center of the plug 17. A lock screw 84' threads into the plug 17 behind the adjusting screw 84. The spring 83 provides a preloading of the vane element 67, which loading is opposite to the force of the liquid projected against the vane element from the nozzle 69. In cases where the diaphragm 24 is stiffer than average and is difficult to deflect, the force of the spring 75 can be reduced by backing off the screw 84 to compensate for the abnormal stiffness of the diaphragm 24. Conversely, in cases where the stiffness of the diaphragm 24 is below average, and the diaphragm deflects with only light force, the pressure of the spring 83 is increased by turning down the adjusting screw 84 until the spring pressure compensates for the subnormal stiffness of the diaphragm 24.

The force exerted by the liquid against the vane element 67 does not vary uniformly in proportion to the increase in the rate of flow. The vane element 67 is operated by the momentum of the liquid, and the momentum varies as the square of the velocity of the stream. An increase that doubles the rate of flow, therefore, increases the force against the vane element 67 approximately 4 times.

When it is desirable to have the indicator hand move along a scale having uniform graduations, the non-lineal variation of the liquid force against the vane element can be compensated for in various ways. One way is illustrated in Fig. 6 which shows a development of the potentiometer with successive coils 85 of wire of different diameter so that the variation in the effect produced by the potentiometer compensates for the non-uniform variation of the liquid pressure and thus moves the indicator hand uniformly for equal variations in the rate of flow.

Fig. 5 shows a modified form of the invention in which a housing 88 is mounted on top of a pipe 89 through which liquid passes. A vane element 90, of streamlined shape, is located in the stream of liquid and attached to the lower end of an operating lever 92 which is similar in function, though somewhat different in shape, from the operating lever 28 already described in connection with the preferred embodiment of the invention.

The operating lever 92 extends through and is bonded to the sleeve 26 of the diaphragm 24. Above the diaphragm, the operating lever 92 extends upward through the sealed chamber in the housing 88, to a gear segment 42 that is attached to the top of the operating lever. This gear segment meshes with a pinion gear 43 on a shaft leading to a potentiometer, as already described.

The apparatus shown in Fig. 5 employs a mechanical construction that compensates for the non-uniform variation of the liquid pressure with change of flow. A leaf spring 94 extends into a slot in a fixed part of the housing and is anchored in the slot by a set screw 96.

A second spring 97 is anchored at its lower end in the same slot as the spring 94, but the upper end of the second spring 97 is held back away from the operating lever 92 by a stud 99 extending from a fixed wall in the housing 88.

The immediate portion of the spring 97, between its ends, passes across a row of calibrating screws 101 which thread into a fixed retainer in the housing 88. These screws are adjusted to abut against the spring 97 and give it an arched surface that serves as a continuous abutment for the leaf spring 94, and the shape of the arch of this second spring 97 is so adjusted that it leaves progressively shorter lengths of the spring 94 free as the operating lever 92 is moved by increasing force from the liquid stream. This variation in the free or effective length of the leaf spring 97 varies in such a way as to compensate mechanically for the non-uniform variation in the force of the liquid against the vane element 90.

This construction in which the leaf spring 97 spans the space between the calibrating screws 101 makes the apparatus obtain more accurate results because the calibrating screws can be adjusted to give the spring 97 the theoretically correct shape for obtaining the desired variation in the length of the spring 94. In earlier constructions in which a moving spring has been used in combination with calibrating screws with which it contacts directly, the results obtained are accurate only at the various points at which the spring comes into contact with each calibrating screw. As the spring continues to move, the results obtained with such apparatus become increasingly less accurate until the spring contacts with the next calibrating screw.

The preferred embodiment and one modification of the invention have been shown and described, but changes and other modifications can be made, and some features can be used alone or in different combinations without departing from the invention as defined in the claims.

I claim as my invention:

1. A flow meter comprising a vane located in the path of the liquid of which the flow is to be measured, an indicator, operating connections between the vane and indicator, means for compensating for the non-linear variation of force against the vane with change of flow, said means for compensating comprising a first leaf spring which bears against a portion of the operating connections at one region and which is anchored to a stationary support at the other end, a second leaf spring behind the first leaf spring and anchored to the stationary support at the same end as the first leaf spring and in contact with the first leaf spring along at least a portion of the length of the springs toward their anchored ends, an abutment that holds the second leaf spring bowed toward its side that contacts with the first spring and behind the first spring and in position to be contacted progressively along its length by the first spring as said first spring is bent by increasing force of the liquid stream against the vane, and a row of calibrating screws behind the second spring adjustable to control the shape of the bow of the surface of the second spring with which the first spring comes in contact.

2. A flow meter for measuring the flow of a fluid, including in combination, a housing forming a chamber for the fluid which is to have its flow measured, an element located in the chamber and in a stream of the fluid, resilient means resisting movement of said element by the fluid stream, mechanism for operating an indicator, motion-transmitting connections between said mechanism and the element in the fluid, said housing having another chamber in which part of the motion transmitting connections are enclosed, a flexible diaphragm having a central opening therein, the diaphragm sealing the chambers from one another and being located in position that exposes the diaphragm to pressure in the chambers substantially equally on all sides of said opening, a lever comprising a part of the motion-transmitting connections, sleeve means attached to the diaphragm adjacent to the edge of the central opening, said lever extending through the central opening and lengthwise through the sleeve means and being connected to the sleeve means, a support for the lever carried directly by the housing and clear of the diaphragm and having a portion extending through the central opening in the diaphragm and into one end of the sleeve means, and a fulcrum bearing for the lever carried by said support and located with the axis of the fulcrum bearing substantially at the neutral axis of the diaphragm, said lever having a cross section in the sleeve beyond the fulcrum sufficient to fully close the sleeve means against flow of fluid between the chambers.

3. The flow meter described in claim 2, characterized by a metal diaphragm having circular corrugations extending around the region at which the operating lever passes through the diaphragm and substantially concentric with the central opening.

4. A flow meter comprising a housing forming a lower chamber which connects with a passage through which a flow of fluid is to be measured, an element that extends into the stream of fluid in said passage, resilient means resisting movement of said element by the stream of fluid, mechanism for operating an indicator, motion-transmitting connections between said mechanism and the element in the fluid stream, said housing having another chamber located immediately above the first chamber and in which part of the motion-transmitting connections are enclosed, a flexible diaphragm across the top of the first chamber and forming a partition for separating the chambers from one another, the diaphragm having a central opening therethrough, a lever comprising a part of the motion-transmitting connections, sleeve means attached to the diaphragm adjacent to the edge of the central opening, the lever extending upwardly from the first chamber and through the central opening in the diaphragm and lengthwise through the sleeve means and upwardly into the chamber above the diaphragm, said lever being connected to the sleeve means and having a cross section, near one end of the sleeve, sufficient to fill the sleeve and prevent passage of fluid through said sleeve means, a support for the lever carried directly from the housing clear of the diaphragm and having a portion extending through the central opening in the diaphragm and into the end of the sleeve means remote from the end which is closed by the full cross section of the lever, and a fulcrum bearing for the lever carried by said support and located with the axis of the fulcrum bearing substantially at the neutral axis of the diaphragm.

5. A flow meter described in claim 2, characterized by an element in the first chamber comprising a streamlined vane connected to the lower end of the lever and movable with the lever about the fulcrum axis of the lever as the vane is moved downstream by the force of the fluid flow or upstream by the resilient means which resists movement of the vane.

References Cited in the file of this patent

UNITED STATES PATENTS

| Number | Name | Date |
|---|---|---|
| 1,111,684 | Vaughan | Sept. 22, 1914 |
| 1,401,299 | Wohlenberg | Dec. 27, 1921 |
| 1,495,010 | Ford | May 20, 1924 |
| 1,637,927 | Bonn | Aug. 2, 1927 |
| 1,818,973 | De Giers | Aug. 18, 1931 |
| 1,920,971 | De Giers | Aug. 8, 1933 |
| 1,927,973 | Bull | Sept. 26, 1933 |
| 2,024,571 | Gent | Dec. 17, 1935 |
| 2,065,834 | Swennes | Dec. 29, 1936 |
| 2,160,266 | Grisdale | May 30, 1939 |
| 2,252,029 | Pieper | Aug. 19, 1941 |
| 2,424,511 | Stanley et al. | July 22, 1947 |
| 2,522,796 | Olson et al. | Sept. 19, 1950 |

FOREIGN PATENTS

| Number | Country | Date |
|---|---|---|
| 195,794 | Germany | Feb. 25, 1908 |
| 215,355 | Germany | Oct. 26, 1909 |
| 300,545 | Germany | Sept. 15, 1917 |
| 330,230 | Germany | Dec. 9, 1920 |
| 369,588 | Great Britain | Mar. 21, 1932 |